US008437955B2

United States Patent
Koido

(10) Patent No.: US 8,437,955 B2
(45) Date of Patent: May 7, 2013

(54) MAP DRAWING DEVICE AND MAP DATA DISPLAY CONTROL METHOD

(75) Inventor: Yasuhiro Koido, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 666 days.

(21) Appl. No.: 12/632,227

(22) Filed: Dec. 7, 2009

(65) Prior Publication Data

US 2010/0145614 A1     Jun. 10, 2010

(30) Foreign Application Priority Data

Dec. 8, 2008 (JP) .................. 2008-312249

(51) Int. Cl.
*G08G 1/123* (2006.01)
(52) U.S. Cl.
USPC ........................................... 701/455
(58) Field of Classification Search .................. 701/455; 903/903; 303/7, 68, 128, 176; 320/104, 320/165, 128, 109
See application file for complete search history.

(56) References Cited

U.S. PATENT DOCUMENTS 6,950,100 B2 * 9/2005 Yamada et al. ............... 345/428
2008/0243375 A1 * 10/2008 Han ............................. 701/208

FOREIGN PATENT DOCUMENTS

JP         08-075480 A    3/1996

* cited by examiner

*Primary Examiner* — Thomas Black
*Assistant Examiner* — Luke Huynh
(74) *Attorney, Agent, or Firm* — Sughrue Mion, PLLC

(57) ABSTRACT

A map drawing device can reduce the use amount of a video memory and power consumption. The map drawing device comprises an arithmetic processing unit that operates according to a map drawing program and outputs an address of map data to be drawn; an address difference detection circuit that makes comparison of each address of map data output one by one from the arithmetic processing unit and determines whether or not to output a transfer start trigger signal to a data transfer control unit; and a data transfer control unit that directly transfers the map data with the address instructed by the arithmetic processing unit from a map data storage medium to the video memory based on the transfer start trigger signal output from the address difference detection circuit.

6 Claims, 5 Drawing Sheets

MAP DRAWING DEVICE AND MAP DATA DISPLAY CONTROL METHOD

TECHNICAL FIELD

Reference to Related Application

This application is based upon and claims the benefit of the priority of Japanese patent application No. 2008-312249, filed on Dec. 8, 2008, the disclosure of which is incorporated herein in its entirety by reference thereto.

The present invention relates to a map drawing device and a map data display control method. More specifically, the invention relates to a map drawing device and a map data display control method that can be applied to a navigation device which displays a current location of a moving body or the like.

BACKGROUND

Patent Document 1 discloses a navigation device that implements high-speed drawing of a map using one video memory alone. The video memory of the navigation device in Patent Document 1 (VRAM 28 in FIG. 2 of Patent Document 1) has a size capable of storing a map image larger than a map image to be displayed on a screen. Then, a storage region of the video memory (VRAM 28 in FIG. 2 of Patent Document 1) is divided into r×s (such as 2×2) sub-regions. A bitmap map image generated based on map data read from a CD-ROM is stored in each sub-region.

A navigation control unit (indicated by reference numeral 23 in FIG. 2 of Patent Document 1) of the navigation device in Patent Document 1 receives vehicle current position data from a vehicle position measurement unit (indicated by reference numeral 21 in FIG. 2 of Patent Document 1), and checks whether or not a vehicle has reached a rewrite boundary line, and supplies the vehicle current position data to a window position control unit (indicated by reference numeral 26 in FIG. 2 of Patent Document 1). The window position control unit 26 calculates the position (window position) of an image to be extracted from the VRAM (indicated by reference numeral 28 in FIG. 2 of Patent Document 1), based on the received vehicle current position data, and supplies the calculated image position to an image extraction unit (indicated by reference numeral 29 in FIG. 2 of Patent Document 1). The image extraction unit (indicated by reference numeral 29 in FIG. 2 of Patent Document 1) reads the bitmap image of one screen from the VRAM (indicated by reference numeral 28 in FIG. 2 of Patent Document 1), based on the window position, and supplies the read bitmap image to a display unit (indicated by reference numeral 30 in FIG. 2 of Patent Document 1) to display the read bitmap image on the display unit. When the vehicle has reached the rewrite boundary line, the navigation control unit (indicated by reference numeral 23 in FIG. 2 of Patent Document 1) supplies an instruction of reading an adjacent map image to a map data reading control unit (indicated by reference numeral 24 in FIG. 2 of Patent Document 1), as shown in FIG. 4 of Patent Document 1. Then, the navigation control unit instructs a display control unit (indicated by reference numeral 27 in FIG. 2 of Patent Document 1) to rewrite the VRAM (indicated by reference numeral 28 in FIG. 2 of Patent Document 1). In this manner, whenever the vehicle moves, above-mentioned processes are repeated. A map image is scroll-displayed on a display screen (screen).

[Patent Document 1]
JP Patent Kokai Publication No. JP-A-8-75480

SUMMARY

The entire disclosure of above Patent Document is incorporated herein by reference thereto.

In recent years, navigation devices have come into wide use in vehicles and mobile devices. Saving of power consumption is then demanded for a semiconductor integrated circuit (LSI) for a navigation device, as well. The semiconductor integrated circuit (LSI) for the navigation device implements functions necessary for the navigation device.

Further, due to a finer fabrication process in connection with an increase in the scale of the LSI, an amount of heat generated at a time of operating the LSI increases. Thus, a component for cooling the LSI is added, and an increase in the cost caused by the addition of the component is regarded as a problem. In terms of cooling component reduction as well, a demand for reduced power consumption, which leads to a total cost reduction, has been increased.

In the above-mentioned method in Patent Document 1, however, data transfer is made from the image extraction unit (indicated by reference numeral 29 in FIG. 2 of Patent Document 1) to the display unit (indicated by reference numeral 30 in FIG. 2 of Patent Document 1) irrespective of whether the vehicle has moved or not. Thus, the degree of saving of power consumption may not be high. Further, in the method described in Patent Document 1, the video memory VRAM of a size sufficiently larger than a map image to be displayed on the screen must be provided, in order to reduce a frequency of rewriting the video memory VRAM. Thus, the power consumption for the rewriting will be naturally large. On the contrary, when the size of the video memory VRAM is reduced, determination as to whether the vehicle has reached the rewrite boundary line frequently occurs. Thus, the number of times of rewriting the video memory, or power consumption would increase. After all, in the method in Patent Document 1, merely the number of the VRAMs can be just reduced to one, and thus the configuration of the navigation device is not suited to saving power consumption. Thus there is much desired to in the art.

According to a first aspect of the present invention, there is provided a map drawing device comprising:

an arithmetic processing unit that operates according to a map drawing program and outputs an address of map data to be drawn;

an address difference detection circuit that makes comparison of each address of map data output one by one from the arithmetic processing unit, and determines whether or not to output a transfer start trigger signal to a data transfer control unit; and a data transfer control unit that directly transfers the map data with the address instructed by the arithmetic processing unit to a video memory from a map data storage medium, based on the transfer start trigger signal output from the address difference detection circuit.

According to a second aspect of the present invention, there is provided a map data display control method comprising:

making comparison of each address of map data output one by one from an arithmetic processing unit, the arithmetic processing unit operating according to a map drawing program and outputting the address of map data to be drawn;

determining whether or not to rewrite a map based on a result of the comparison; and transferring the map data with the address instructed by the arithmetic processing unit from a map data storage device to a video memory when rewriting of the map is determined to be necessary.

The meritorious effects of the present invention are summarized as follows.

According to the present invention, the use amount of the video memory and power consumption can be reduced. The reason for allowing the reduction resides in that the circuit which determines whether or not to rewrite the map is provided to prevent unnecessary rewriting of the video memory. Further, a configuration is adopted in which map data is directly written into the video memory from the data transfer control unit. The reduction is therefore allowed.

PREFERRED MODES

According to the present invention, there are possible modes as follows.

Mode 1. set forth as the first aspect.

Mode 2. The map drawing device according to mode 1, wherein the address difference detection circuit outputs the transfer start trigger signal to the data transfer control unit when a map data address change assumes a predetermined threshold value or higher.

Mode 3. The map drawing device according to mode 1, wherein the address difference detection circuit includes: a first address register that stores the address output from the arithmetic processing unit; a second address register that is rewritten when the address of map data has been changed; and an address mismatch detection circuit that calculates a difference between the address stored in the first address register and an address stored in the second address register, and prevents output of the transfer start trigger signal to the data transfer control unit when the addresses match.

Mode 4. The map drawing device according to mode 2, wherein the address difference detection circuit comprises: a first address register that stores the address output from the arithmetic processing unit; a second address register that is rewritten when the address of map data has been changed; a minimum travel amount holding register that stores a threshold value for determining whether or not to output the transfer start trigger signal; and a minimum travel amount detection circuit that calculates a difference between the address stored in the first address register and an address stored in the second address register, and prevents output of the transfer start trigger signal to the data transfer control unit when the address difference is less than the threshold value.

Mode 5. The map drawing device according to mode 4, wherein whenever scaling of a map is changed, the threshold value stored in the minimum travel amount holding register is changed.

Mode 6. The map drawing device according to any one of modes 1 through 5, wherein the map drawing program is a program that displays a current location of a moving body, and functions as a navigation device.

Mode 7. A map data display control method set forth as the second aspect.

OVERVIEW OF THE INVENTION

Figure 1:
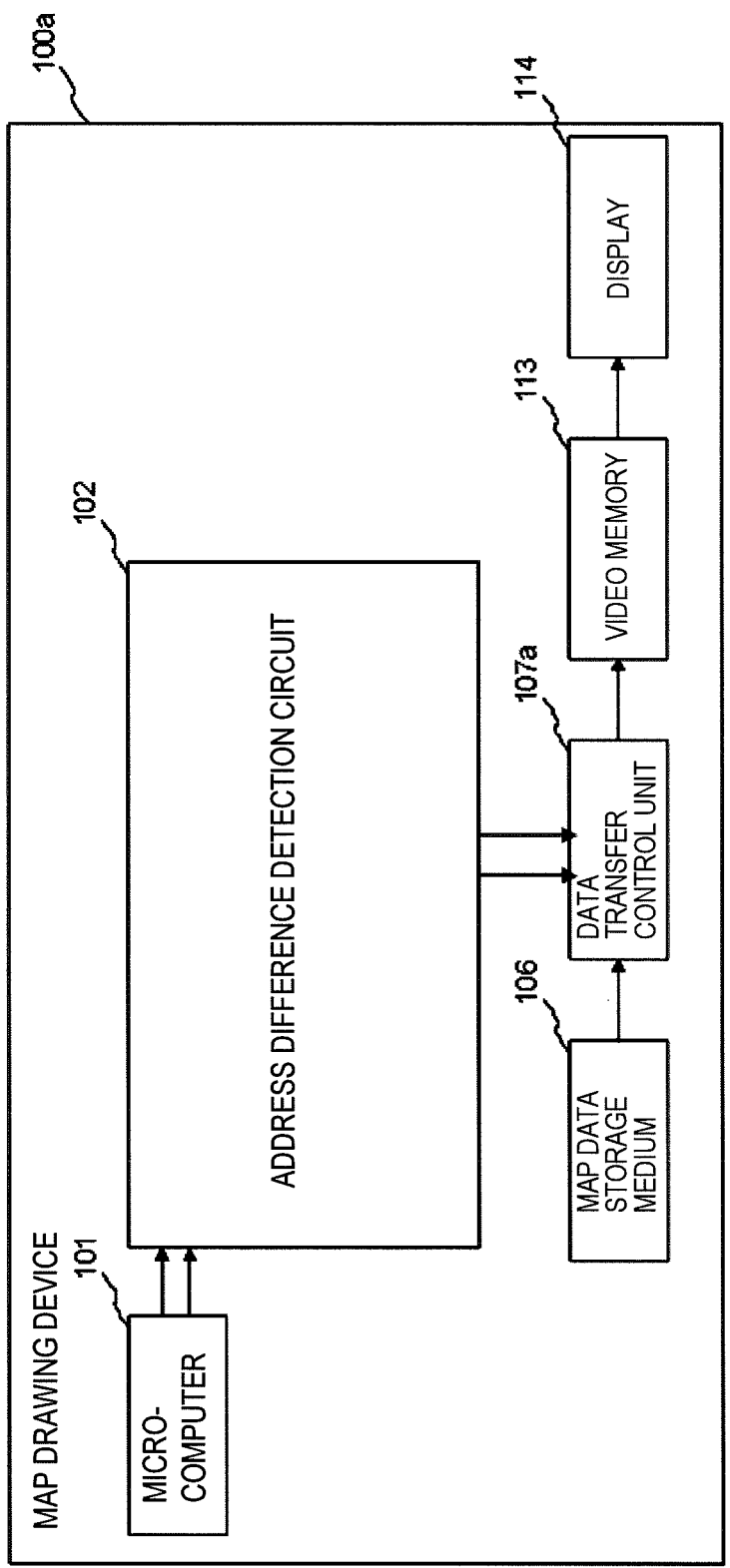
FIG. 1 is a diagram for explaining an overview of the present invention.

First, an overview of the present invention will be described with reference to FIG. 1. A map drawing device 100*a* according to the present invention may include a microcomputer 101 that functions as an arithmetic processing unit, an address difference detection circuit 102, a map data storage medium 106, a data transfer control unit 107*a*, a video memory 113, and a display 114.

The microcomputer 101 operates according to a map drawing program, and functions as the arithmetic processing unit that outputs an address of map data to be drawn, stored in the map data storage medium 106.

The address difference detection circuit 102 makes comparison of each address of map data output from the microcomputer 101 one by one. When the address difference detection circuit 102 determines as a result of the comparison that a map should be rewritten, the address difference detection circuit 102 outputs a transfer start trigger signal 112 to the data transfer control unit 107*a*.

The data transfer control unit 107*a* directly transfers the map data with the address instructed by the microcomputer 101 to the video memory 113 when the transfer start trigger signal 112 is output from the address difference detection circuit 102.

The map data written in the video memory 113 is displayed on the display 114 by a display control unit omitted for illustration.

As described above, the use amount and the frequency of rewriting of the video memory 113 can be reduced, so that power consumption can be reduced. The reason for allowing the reduction resides in that the address difference detection circuit 102 determines whether or not to rewrite the map to prevent unnecessary rewriting of the video memory and that map data is directly written into the video memory 113 by the data transfer control unit 107*a*.

First Exemplary Embodiment

Figure 2:
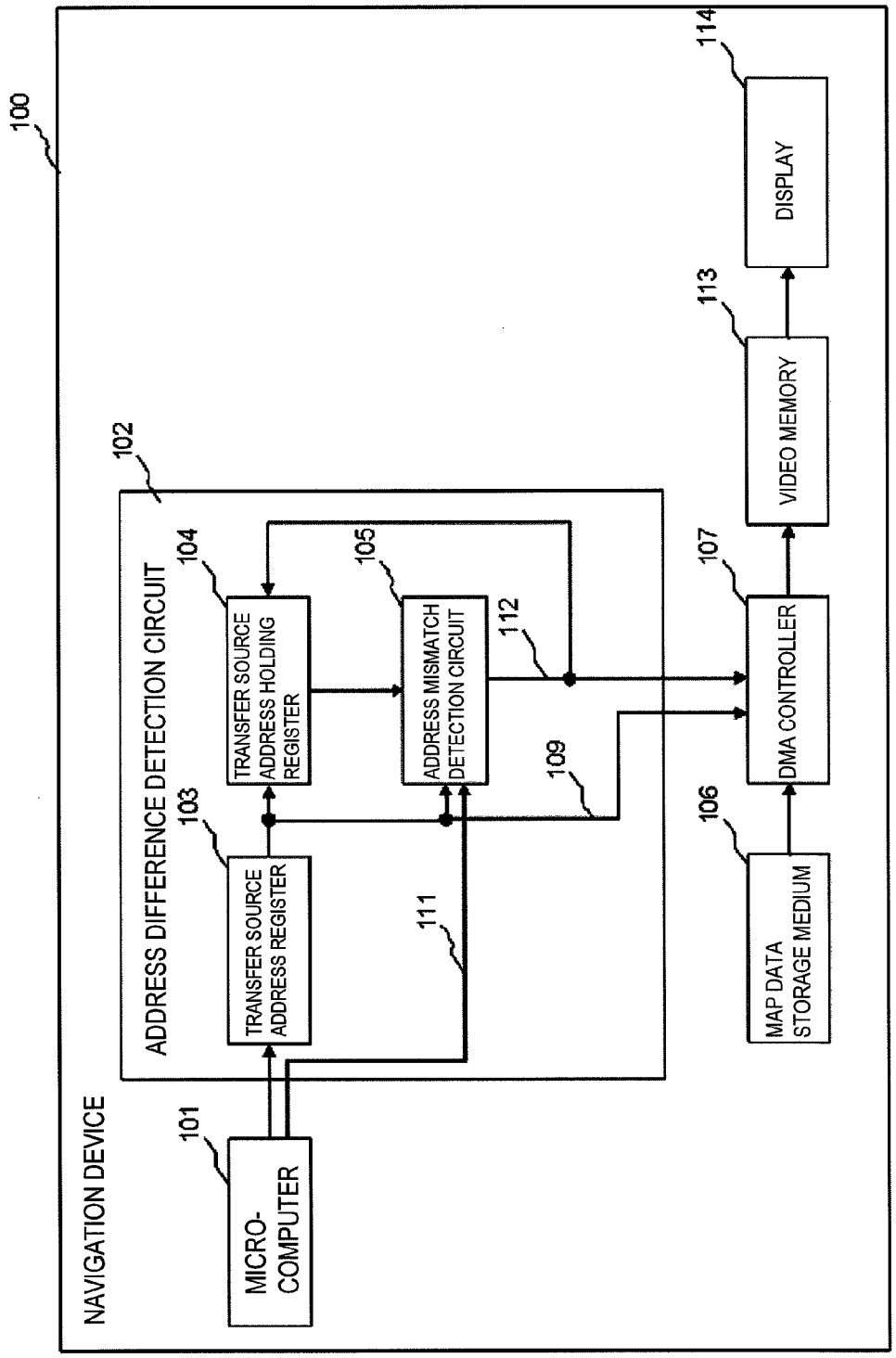
FIG. 2 is a block diagram showing a configuration of a navigation device according to a first exemplary embodiment of the present invention.

Next, a first exemplary embodiment of the present invention will be described in detail with reference to drawings. FIG. 2 is a block diagram showing a configuration of a navigation device according to the first exemplary embodiment of the present invention.

Referring to FIG. 2, a navigation device 100 including a microcomputer 101, an address difference detection circuit 102, a map data storage medium (map data memory) 106, a DMA controller 107, a video memory 113, and a display 114 is shown.

The microcomputer 101 operates according to various navigation programs to be mounted on a vehicle or a portable terminal, and outputs the address of map data to be drawn, stored in the map data storage medium 106, based on position information supplied from position information acquisition means such as a GPS (Global Positioning System) omitted for illustration.

The address difference detection circuit 102 includes a transfer source address register (first address register) 103 that holds the transfer source address indicating the location of the map data to be drawn, a transfer source address holding register (second address register) 104 that is rewritten when a change occurs in a transfer source address setting signal, and an address mismatch detection circuit 105 that outputs a transfer start trigger signal 112 when contents of the transfer source address register (first address register) 103 and the transfer source address holding register (second address register) 104 do not match.

More specifically, the transfer source address holding register (second address register) 104 is rewritten by capturing the transfer source address from the transfer source address register 103 upon receipt of the transfer start trigger signal 112 from the address mismatch detection circuit 105.

The address mismatch detection circuit 105 operates in response to a transfer start trigger signal 111 supplied from the microcomputer 101, and calculates a difference between the transfer source address (address of the map data to be drawn) held in the transfer source address register 103 and a transfer source address (address of map data being currently displayed on the display 114) held in the transfer source address holding register 104. When the transfer source address held in the transfer source address register 103 matches the transfer source address held in the transfer source address holding register 104, the address mismatch detection circuit 105 does not issue the transfer start trigger signal 112 to the DMA controller 107. Only when the transfer source address held in the transfer source address register 103 does not match the transfer source address held in the transfer source address holding register 104, the address mismatch detection circuit 105 issues the transfer start trigger signal 112 to the DMA controller 107.

The map data storage medium (map data memory) 106 is constituted from a semiconductor memory and various disk media that store various map data used for navigation.

The DMA controller 107 functions as a data transfer control unit. Upon receipt of the transfer start trigger signal 112 from the address mismatch detection circuit 105, the DMA controller 107 transfers the map data on the map data storage medium (map data memory) 106 to the video memory 113 according to a transfer source address 109 from the transfer source address register 103.

The video memory 113 is constituted from a VRAM (Video Random Access Memory). The display 114 is constituted from a liquid crystal display device or the like, and displays the map data held in the video memory 113.

Figure 3:
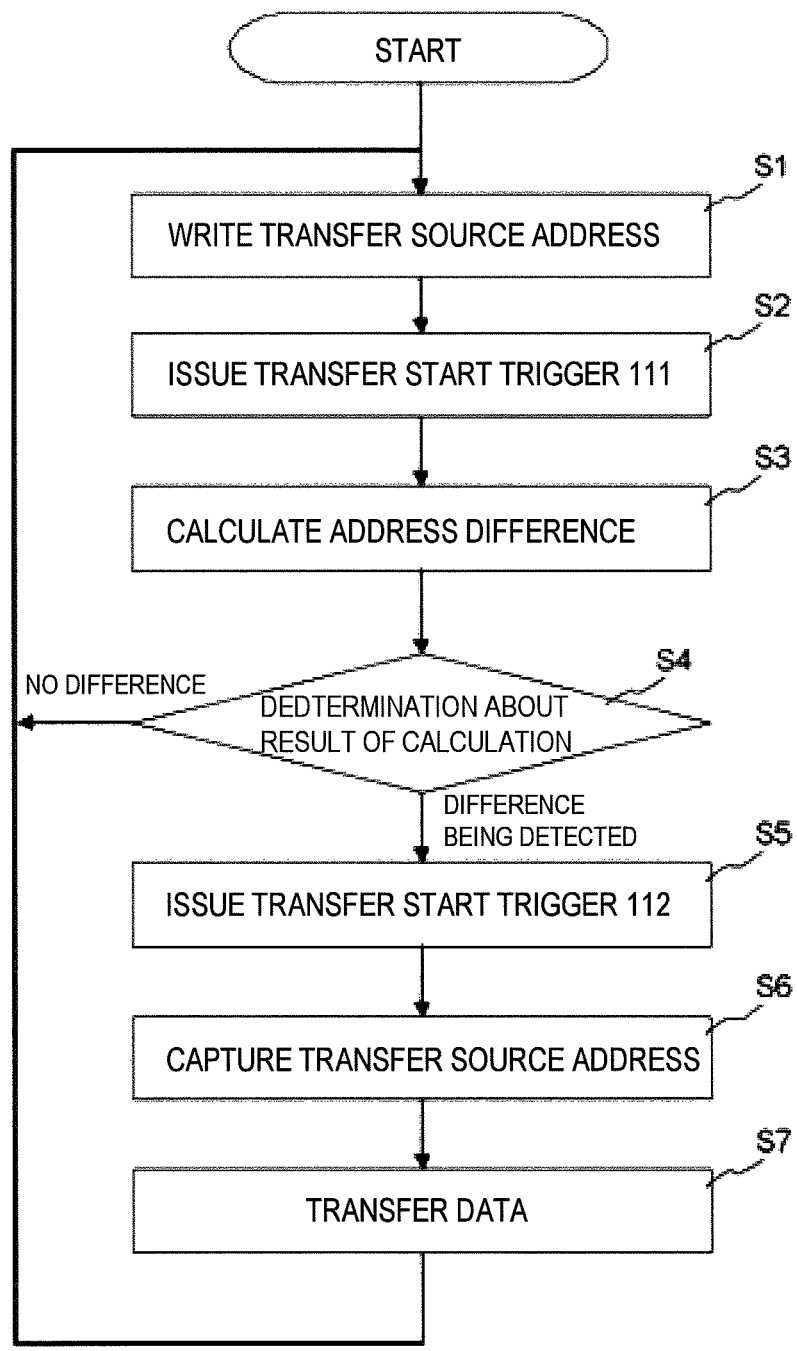
FIG. 3 is a flowchart showing an operation of the navigation device according to the first exemplary embodiment of the present invention.

Next, an operation of this exemplary embodiment will be described in detail with reference to drawings. FIG. 3 is a flowchart showing an operation of the navigation device according to this exemplary embodiment. Referring to FIG. 3, the microcomputer 101 first writes a transfer source address in the transfer source address register 103 (in step S1).

Next, the microcomputer 101 issues the transfer start trigger signal 111 to the address mismatch detection circuit 105 (in step S2).

The address mismatch detection circuit 105 that has received the transfer start trigger signal 111 calculates a difference between the address in the transfer source address register 103 and an address in the transfer source address holding register 104 (in step S3).

When it is found as a result of the calculation that there is no address difference ("no difference" in step S4), a data transfer process after step S5 is omitted (thereby causing the operation to return to step S1).

When it is found that there is the address difference, the address mismatch detection circuit 105 issues the transfer start trigger signal 112 to the transfer source address holding register 104 and the DMA controller 107 (in step S5).

When the transfer start trigger signal 112 is issued, the transfer source address in the transfer source address register 103 is captured into the transfer source address holding register 104 (in step S6).

The DMA controller 107 transfers data from the map data storage medium (map data memory) 106 to the video memory 113 according to the transfer source address 109 (in step S7).

The above-mentioned processes are repeated. When there is no difference between addresses in the transfer source address register 103 and the transfer source address holding register 104, transfer of data to the video memory 113 is prevented. Thus, power consumption can be reduced.

Power that is consumed by the navigation device 100 for map display during a time period t can be calculated, based on the following expression.

Power Consumption=Power Consumption Used for Each Map Data Transfer×Number of Updating of Screen Display×During Time Period t×Change Rate of Transfer Source Address    Expression 1

In the case of a running pattern of 10-mode fuel consumption, for example, idling periods are included. Thus, the change rate of the transfer source address is calculated to be 73%. Assume that power consumption in a case where the present invention is not applied is 100%. Then, according to the present invention, power consumption can be reduced by 27%.

On the other hand, in this exemplary embodiment, it is enough to use just an amount of the VRAM corresponding to one screen. The VRAM is used as the video memory. It is to be noted that, in the method in Patent Document 1, an image extraction process is performed at a time of transfer from a VRAM to a display unit, and it is therefore necessary to hold the VRAM corresponding to four screens. The reason why the use amount of the video memory can be greatly reduced in this manner is that extraction is performed at a time of data transfer from the map data storage medium (map data memory) 106 to the video memory 113 using the DMA controller 107.

Second Exemplary Embodiment

Figure 4:
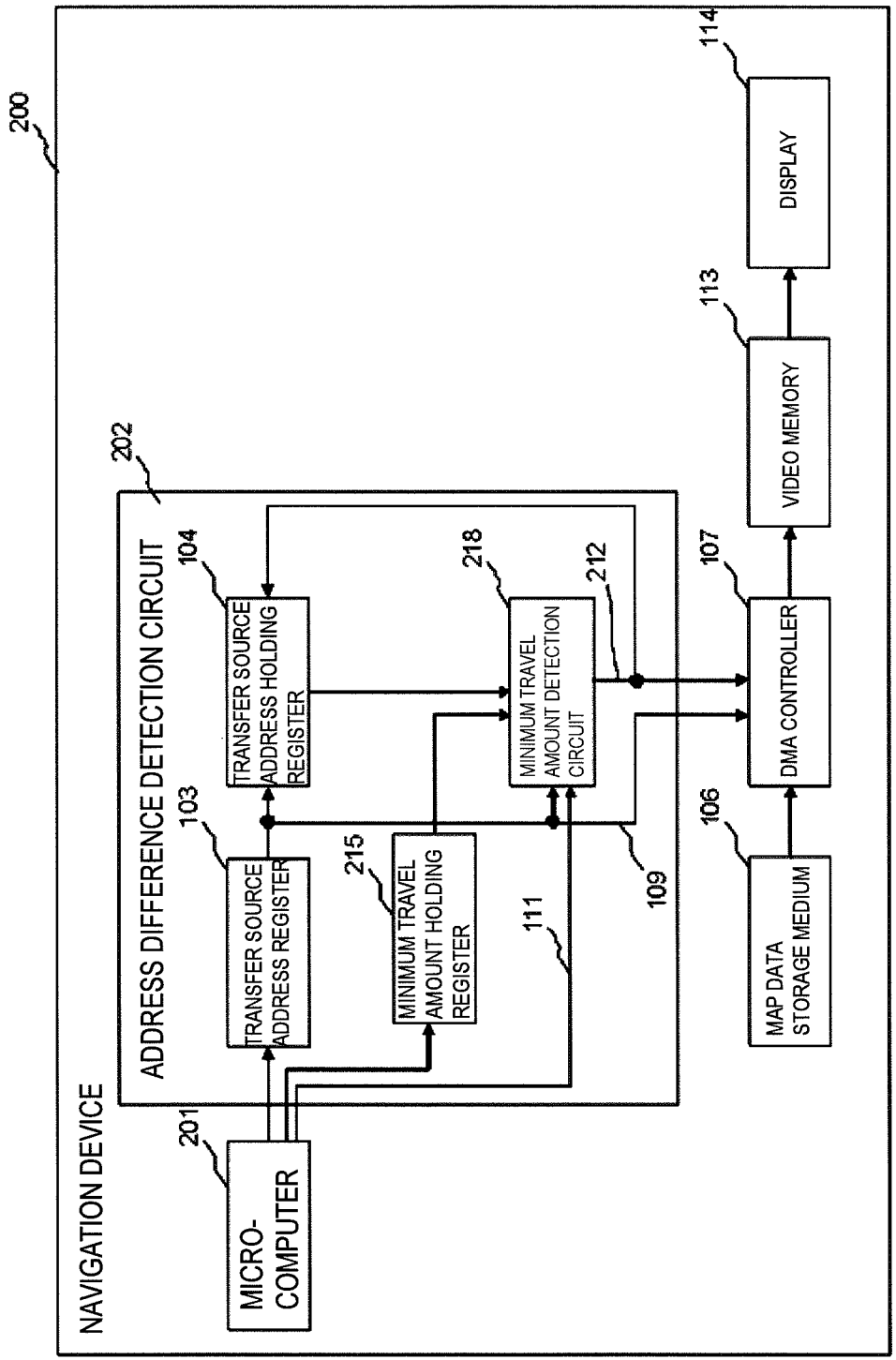
FIG. 4 is a block diagram showing a configuration of a navigation device according to a second exemplary embodiment of the present invention.

Next, a second exemplary embodiment of the present invention capable of further reducing power consumption will be described in detail with reference to drawings. FIG. 4 is a block diagram showing a configuration of a navigation device according to the second exemplary embodiment of the present invention.

Referring to FIG. 4, a navigation device 200 including a microcomputer 201, an address difference detection circuit 202, a map data storage medium (map data memory) 106, a DMA controller 107, a video memory 113, and a display 114 is shown.

A description will be given below, centering on a difference from the navigation device 100 according to the first exemplary embodiment described above.

The microcomputer 201 according to this exemplary embodiment includes a function of writing a minimum travel amount used as a threshold value for determining whether or not to output a transfer start trigger signal 111 to a minimum travel amount holding register 215, in addition to the function of the microcomputer 101 of the navigation device 100 according to the first exemplary embodiment.

A minimum travel amount holding register 215 that holds the minimum travel amount is added to the address difference detection circuit 202 according to this exemplary embodiment. Then, a minimum travel amount detection circuit 218 is provided instead of the address mismatch detection circuit 105.

The minimum travel amount detection circuit 218 operates in response to the transfer start trigger signal 111 supplied from the microcomputer 201, and calculates a difference between a transfer source address (address of map data to be drawn) held in a transfer source address register 103 and a transfer source address (or the address of map data being currently displayed on the display 114) held in a transfer source address holding register 104. Then, when it is found that the difference is less than the minimum travel amount held in the minimum travel amount holding register 215, the minimum travel amount detection circuit 218 does not issue a transfer start trigger signal 212 to the DMA controller 107. Only when the difference is equal to or larger than the minimum travel amount, the minimum travel amount detection circuit 218 issues the transfer start trigger signal 212 to the DMA controller 107.

Configurations of other components in the navigation device 200 are the same as those in the navigation device 100 according to the first exemplary embodiment. Thus, descriptions of the other components will be omitted.

Figure 5:
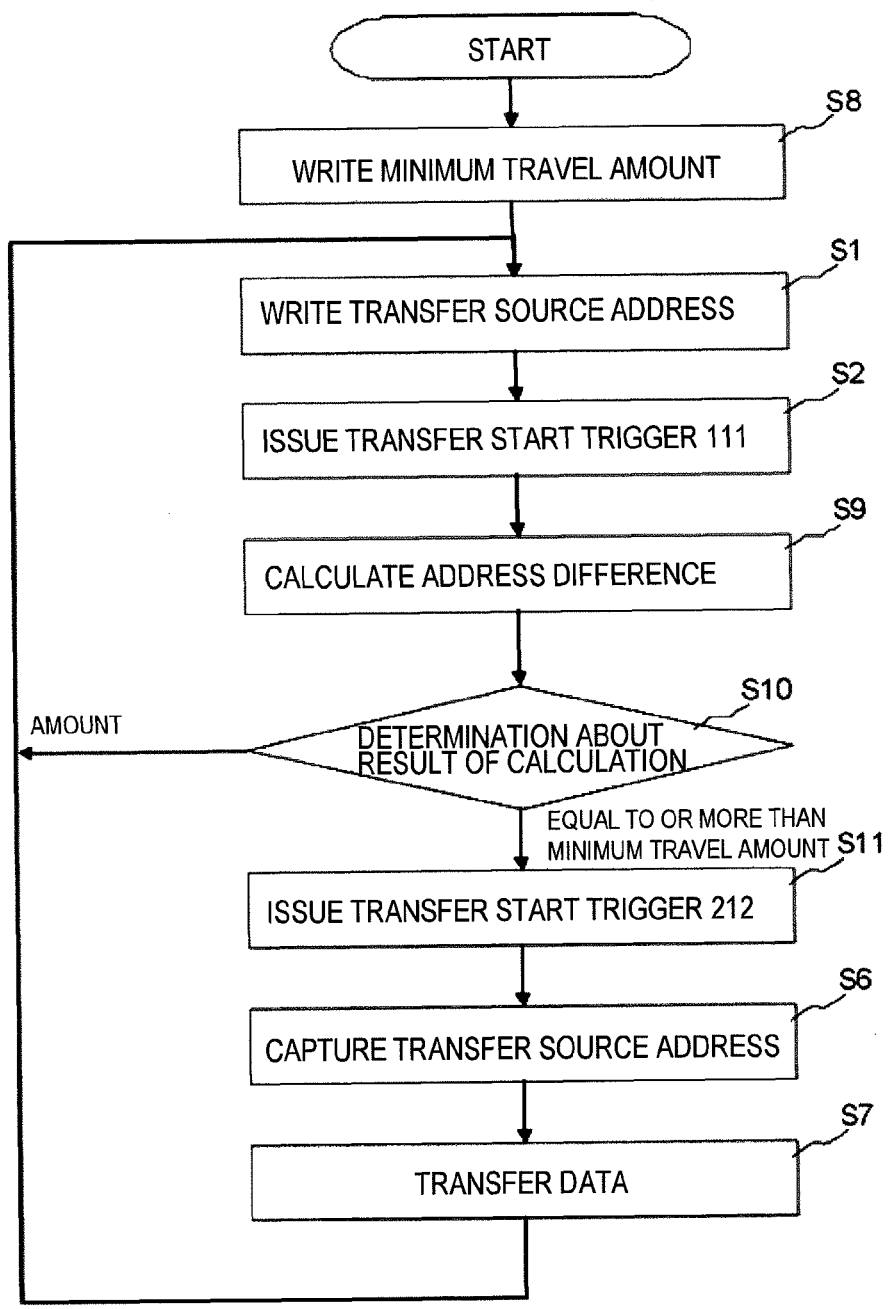
FIG. 5 is a flowchart showing an operation of the navigation device according to the second exemplary embodiment of the present invention.

Next, an operation of this exemplary embodiment will be described in detail with reference to drawings. FIG. 5 is a flowchart showing the operation of the navigation device according to this exemplary embodiment. Referring to FIG. 5, the microcomputer 201 first sets in the minimum travel amount holding register 215 the minimum travel amount that becomes the threshold value for executing transfer (in step S8).

Preferably, a process of setting the above-mentioned minimum travel amount is performed whenever scaling of a map is changed. This can prevent data transfer to the video memory 113 more efficiently.

Subsequent steps S1 and S2 are the same as those in the first exemplary embodiment described above. Thus, descriptions of these steps will be omitted.

The minimum travel amount detection circuit 218 that has received the transfer start trigger signal 111 calculates a difference between addresses in the transfer source address register 103 and the transfer source address holding register 104 (in step S9).

When it is found as a result of the calculation that the difference is less than the minimum travel amount held in the minimum travel amount holding register 215 ("less than minimum travel amount" in step S10), a data transfer process after step S11 is omitted (thereby causing the operation to return to step S1).

On the other hand, when it is found that the difference is equal to or more than the minimum travel amount held in the minimum travel amount holding register 215 ("equal to or more than minimum travel amount" in step S10), the minimum travel amount detection circuit 218 issues the transfer start trigger signal 212 to the transfer source address holding register 104 and the DMA controller 107 (in step S11).

Subsequent operations are the same as those in the first exemplary embodiment described above. The transfer source address in the transfer source address register 103 is captured into the transfer source address holding register 104 (in step S6), and data transfer is made from the map data storage medium (map data memory) 106 to the video memory 113 by the DMA controller 107 (in step S7).

The above-mentioned processes are repeated. When there is no significant difference between addresses in the transfer source address register 103 and the transfer source address holding register 104, data transfer to the video memory 113 is prevented. Power consumption can be therefore reduced.

According to this exemplary embodiment, a travel amount of a degree about which a user does not care (travel amount of a degree based on scaling of map data, which does not require rewriting of a map), for example, can be set. This makes it possible to prevent data transfer when travel of a very short distance on the map is detected. Power consumption of the navigation device can be further reduced.

The above description was given about the preferable exemplary embodiments of the present invention. The present invention is not, however, limited to the exemplary embodiments described above. Further variations, substitutions, and adjustments may be added within a scope without departing from the basic technical concept of the present invention. The present invention, for example, can be applied to a portable terminal having a navigation function as well as the car navigation device. It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A map drawing device comprising:
   an arithmetic processing unit that operates according to a map drawing program and outputs an address of map data to be drawn;
   an address difference detection circuit that makes comparison of each address of map data output one by one from the arithmetic processing unit, and determines whether or not to output a transfer start trigger signal to a data transfer control unit; and
   a data transfer control unit that directly transfers the map data with the address instructed by the arithmetic processing unit to a video memory from a map data storage medium, based on the transfer start trigger signal output from the address difference detection circuit,
   wherein the address difference detection circuit includes:
   a first address register that stores the address output from the arithmetic processing unit;
   a second address register that is rewritten when the address of map data has been changed; and
   an address mismatch detection circuit that calculates a difference between the address stored in the first address register and an address stored in the second address register, and prevents output of the transfer start trigger signal to the data transfer control unit when the addresses match.

2. The map drawing device according to claim 1, wherein the address difference detection circuit outputs the transfer start trigger signal to the data transfer control unit when a map data address change assumes a predetermined threshold value or higher.

3. The map drawing device according to claim 1, wherein the map drawing program is a program that displays a current location of a moving body, and functions as a navigation device.

4. A map drawing device comprising:
   an arithmetic processing unit that operates according to a map drawing program and outputs an address of map data to be drawn;

an address difference detection circuit that makes comparison of each address of map data output one by one from the arithmetic processing unit, and determines whether or not to output a transfer start trigger signal to a data transfer control unit; and a data transfer control unit that directly transfers the map data with the address instructed by the arithmetic processing unit to a video memory from a map data storage medium, based on the transfer start trigger signal output from the address difference detection circuit, the address difference detection circuit comprises:

a first address register that stores the address output from the arithmetic processing unit;

a second address register that is rewritten when the address of map data has been changed;

a minimum travel amount holding register that stores a threshold value for determining whether or not to output the transfer start trigger signal; and a minimum travel amount detection circuit that calculates a difference between the address stored in the first address register and an address stored in the second address register, and prevents output of the transfer start trigger signal to the data transfer control unit when the address difference is less than the threshold value.

5. The map drawing device according to claim 4, wherein whenever scaling of a map is changed, the threshold value stored in the minimum travel amount holding register is changed.

6. A map data display control method comprising:

making comparison of each address of map data output one by one from an arithmetic processing unit, the arithmetic processing unit operating according to a map drawing program and outputting the address of map data to be drawn;

determining whether or not to rewrite a map based on a result of the comparison; and transferring the map data with the address instructed by the arithmetic processing unit from a map data storage device to a video memory when rewriting of the map is determined to be necessary, wherein the making comparison of each address of map data output one by one from an arithmetic processing unit further comprises:

storing a first address register with the address output from the arithmetic processing unit;

rewriting a second address register when the address of map data has been changed; and calculating a difference between the address sorted in the first address register and the address stored in the second address register.

* * * * *